United States Patent
Jiang et al.

(10) Patent No.: US 10,256,872 B2
(45) Date of Patent: Apr. 9, 2019

(54) METHODS FOR PERFORMING ANTENNA BEAM SCANNING

(71) Applicant: Apple Inc., Cupertino, CA (US)

(72) Inventors: Yi Jiang, Cupertino, CA (US); Siwen Yong, Santa Clara, CA (US); Jiangfeng Wu, Santa Clara, CA (US); Lijun Zhang, San Jose, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/584,889

(22) Filed: May 2, 2017

(65) Prior Publication Data
US 2018/0323834 A1 Nov. 8, 2018

(51) Int. Cl.
| | | |
|---|---|---|
| H04B 7/0408 | (2017.01) |
| G01S 3/32 | (2006.01) |
| G01S 3/42 | (2006.01) |
| H04B 7/06 | (2006.01) |
| H01Q 1/24 | (2006.01) |
| H01Q 3/28 | (2006.01) |

(Continued)

(52) U.S. Cl.
CPC ............. *H04B 7/0408* (2013.01); *G01S 3/32* (2013.01); *G01S 3/42* (2013.01); *H04B 7/0617* (2013.01); *H04B 7/0695* (2013.01); *H01Q 1/24* (2013.01); *H01Q 1/243* (2013.01); *H01Q 3/28* (2013.01); *H01Q 3/36* (2013.01); *H01Q 21/205* (2013.01)

(58) Field of Classification Search
CPC .................................. G06K 7/10356
See application file for complete search history.

(56) References Cited

U.S. PATENT DOCUMENTS

| | | |
|---|---|---|
| 8,781,420 B2 | 7/2014 | Schlub et al. |
| 9,147,935 B2 | 9/2015 | Keidar |

(Continued)

FOREIGN PATENT DOCUMENTS

GB 243191 8/2006

OTHER PUBLICATIONS

Shim et al., "Application of motion sensors for beam-tracking of mobile stations in mmWave communication systems." Sensors 14.10 (2014): 19622-19638. Retrieved at: <http://www.mdpi.com/1424-8220/14/10/19622/htm>.

(Continued)

*Primary Examiner* — Cindy Trandai
(74) *Attorney, Agent, or Firm* — Treyz Law Group, P.C.; Tianyi He; Michael H. Lyons

(57) ABSTRACT

An electronic device may communicate with an external device and may include one or more phased antenna arrays that transmit and receive a beam of millimeter wave signals. Beam steering circuitry may be coupled to the phased antenna array and may be adjusted to steer a direction of the beam. Control circuitry may control the beam steering circuitry to sweep the beam of millimeter wave signals over multiple beam directions. The control circuitry may gather wireless performance data and may compare the wireless performance metric data at each beam direction in the sweep prior to gathering wireless performance metric data at other beam directions in the sweep. The first beam direction in the sweep may be selected based on an initial position of the external device and/or based on sensor data gathered by the control circuitry.

21 Claims, 9 Drawing Sheets

(51) Int. Cl.
  *H01Q 3/36*    (2006.01)
  *H01Q 21/20*   (2006.01)

(56)       References Cited

U.S. PATENT DOCUMENTS

| | | | |
|---|---|---|---|
| 9,178,277 | B1* | 11/2015 | Moretti ................ H01Q 1/2216 |
| 9,386,419 | B2 | 7/2016 | Bengtsson et al. |
| 9,497,054 | B1 | 11/2016 | Li et al. |
| 9,667,290 | B2 | 5/2017 | Ouyang et al. |
| 2009/0323832 | A1* | 12/2009 | Senda .................. H04L 1/0003 |
| | | | 375/259 |
| 2011/0021166 | A1* | 1/2011 | Walley ..................... G01S 3/16 |
| | | | 455/132 |
| 2011/0199274 | A1* | 8/2011 | Dalmazzo ............. G01B 21/22 |
| | | | 343/760 |
| 2011/0300875 | A1* | 12/2011 | Kim ...................... G01S 19/16 |
| | | | 455/456.1 |
| 2012/0064841 | A1 | 3/2012 | Husted et al. |
| 2013/0040655 | A1* | 2/2013 | Keidar .................. H01Q 1/245 |
| | | | 455/456.1 |
| 2013/0135137 | A1* | 5/2013 | Mulder ................ A61B 5/0507 |
| | | | 342/28 |
| 2013/0308717 | A1* | 11/2013 | Maltsev .............. H04B 7/0417 |
| | | | 375/267 |
| 2014/0072078 | A1* | 3/2014 | Sergeyev .............. H04B 7/086 |
| | | | 375/316 |
| 2014/0128032 | A1* | 5/2014 | Muthukumar ........... H01Q 3/00 |
| | | | 455/411 |
| 2014/0266927 | A1* | 9/2014 | Qi .......................... H04B 1/005 |
| | | | 343/702 |
| 2014/0374083 | A1* | 12/2014 | Lee ...................... F24F 11/0034 |
| | | | 165/237 |
| 2015/0102995 | A1* | 4/2015 | Shen ...................... G06F 3/013 |
| | | | 345/156 |
| 2015/0317565 | A1* | 11/2015 | Li .......................... G06N 5/048 |
| | | | 706/52 |
| 2016/0021291 | A1* | 1/2016 | Freund ............... H04N 5/23203 |
| | | | 348/211.2 |
| 2016/0049824 | A1* | 2/2016 | Stein ...................... H02J 7/025 |
| | | | 320/108 |
| 2016/0118716 | A1 | 4/2016 | Stephenne et al. |
| 2016/0178729 | A1* | 6/2016 | Dolgin .................... G01S 7/292 |
| | | | 342/157 |
| 2016/0216130 | A1* | 7/2016 | Abramson ......... G01C 21/3626 |
| 2016/0277088 | A1* | 9/2016 | Jo ......................... H04B 7/0408 |
| 2016/0295502 | A1* | 10/2016 | Yoon ................. H04W 52/0229 |
| 2017/0125901 | A1* | 5/2017 | Sharawi ................... H01Q 3/24 |
| 2017/0189752 | A1* | 7/2017 | Mohrman ............ A63B 24/0006 |
| 2017/0195893 | A1* | 7/2017 | Lee ....................... H04W 16/28 |
| 2017/0278061 | A1* | 9/2017 | Skaaksrud ......... G06Q 10/0833 |
| 2017/0359106 | A1* | 12/2017 | John Wilson ........ H04B 17/318 |
| 2018/0277937 | A1* | 9/2018 | Yang ...................... H01Q 1/273 |

OTHER PUBLICATIONS

Mow et al., U.S. Appl. No. 15/217,805, filed Jul. 22, 2016.

* cited by examiner

METHODS FOR PERFORMING ANTENNA BEAM SCANNING

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave communications bands. Millimeter and centimeter wave communications, which are sometimes referred to as extremely high frequency (EHF) communications, involve communications at frequencies of about 10-400 GHz. Operation at these frequencies may support high bandwidths, but may raise significant challenges. For example, millimeter wave communications are often line-of-sight communications and can be characterized by substantial attenuation during signal propagation.

It would therefore be desirable to be able to provide electronic devices with improved wireless communications circuitry such as communications circuitry that supports millimeter wave communications.

SUMMARY

An electronic device may be provided with wireless circuitry. The wireless circuitry may include one or more antennas and transceiver circuitry such as millimeter wave transceiver circuitry. The antennas may be organized in one or more phased antenna arrays. The phased antenna array may transmit and receive a beam of millimeter wave signals. Beam steering circuitry coupled to the phased antenna array may be adjusted to steer a direction (orientation) of the beam.

The electronic device may perform millimeter wave communications with an external device. If desired, the electronic device may include an electronic device orientation sensor configured to generate orientation data indicative of the orientation of the device. Control circuitry may control the beam steering circuitry to steer the beam of millimeter wave signals in a first direction. The control circuitry may determine whether the beam of millimeter wave signals in the first direction satisfies predetermined wireless performance criteria (e.g., by comparing gathered wireless performance data to a predetermined range of acceptable values). In response to determining that the beam of millimeter wave signals in the first direction fails to satisfy the predetermined wireless performance criteria, the control circuitry may control the beam steering circuitry to steer the beam of millimeter wave signals in a second direction. The second direction may be selected based on the orientation data and/or based on the initial position of the external device. For example, the second direction may be adjacent to the first direction. In response to determining that the beam of millimeter wave signals in the first direction satisfies the predetermined wireless performance criteria, the control circuitry may control the beam to remain in the first direction.

The control circuitry may determine whether the beam of millimeter wave signals in the second direction satisfies the predetermined wireless performance criteria. In response to determining that the beam of millimeter wave signals in the second direction fails to satisfy the predetermined wireless performance criteria, the control circuitry may control the beam steering circuitry to steer the beam of millimeter wave signals in a third direction. This process may be repeated until the beam is pointed towards the external device. By sweeping over different beam directions and determining whether the wireless performance criteria is satisfied at each step of the sweep before gathering performance metric data at the next beam direction in the sweep, the average data throughput between the electronic device and the external device may be greater than in scenarios where all possible beam directions are swept through before identifying the location of the external device.

DETAILED DESCRIPTION

Figure 1:
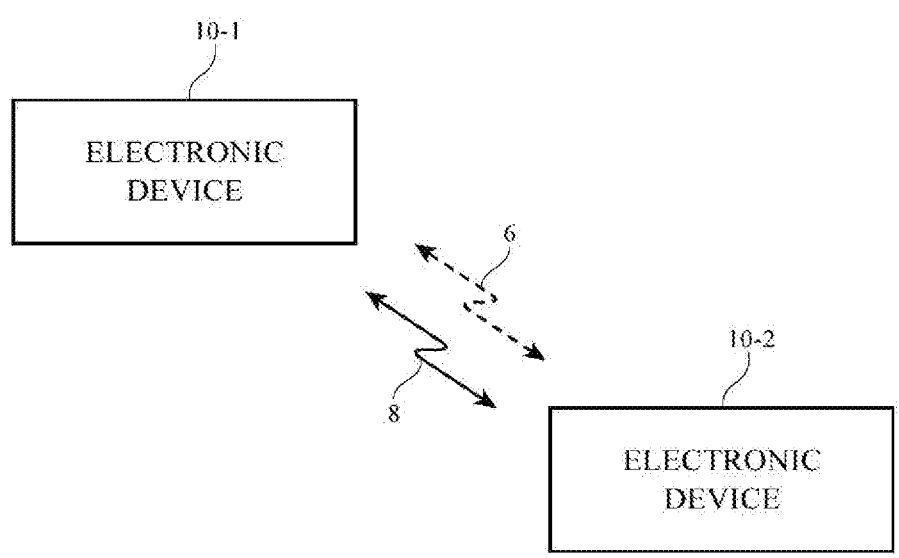
FIG. 1 is a diagram of a wireless system having first and second illustrative electronic devices that may communicate via one or more communication links in accordance with an embodiment.

Electronic devices such as electronic devices 10-1 and 10-2 of FIG. 1 may contain wireless circuitry. The wireless circuitry may include one or more antennas. The antennas may include phased antenna arrays that are used for handling millimeter wave communications. Millimeter wave communications, which are sometimes referred to as extremely high frequency (EHF) communications, involve signals at 60 GHz or other frequencies between about 10 GHz and 400 GHz. If desired, devices 10-1 and/or 10-2 may also contain wireless communications circuitry for handling satellite navigation system signals, cellular telephone signals, local wireless area network signals, near-field communications, light-based wireless communications, or other wireless communications.

Electronic devices 10-1 and 10-2 may each be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station (e.g., a wireless router or other equipment for routing communications between other wireless devices and a larger network such as the internet or a cellular telephone network), a desktop computer, a keyboard, a gaming controller, a computer mouse, a mousepad, a trackpad or touchpad, equipment that implements the functionality of two or more of these devices, or other electronic equipment. Electronic devices 10-1 and 10-2 may be different types of these devices or devices 10-1 and 10-2 may both be the same type of device. Other configurations may be used for devices 10-1 and 10-2 if desired. The example of FIG. 1 is merely illustrative.

Wireless circuitry on electronic device 10-1 may perform wireless communications with wireless circuitry on external equipment such as electronic device 10-2. As shown in FIG. 1, wireless circuitry on electronic device 10-1 may perform millimeter wave communications with wireless circuitry on electronic device 10-2 over a wireless millimeter wave link such as millimeter wave link 8. Millimeter wave link 8 may be, for example, a bidirectional wireless link over which data is conveyed from electronic device 10-1 to electronic device 10-2 and from electronic device 10-2 to electronic device 10-1 (e.g., at one or more millimeter wave frequencies). This is merely illustrative and, in another arrangement, millimeter wave link 8 may be unidirectional.

If desired, wireless circuitry on electronic device 10-1 may perform wireless communications with external equipment such as electronic device 10-2 over a non-millimeter wave link such as optional wireless link 6. Wireless link 6 may be, for example, a wireless local area network (WLAN) link such as a Wi-Fi® link or a wireless personal area network (WPAN) link such as a Bluetooth® link. Link 6 may be bidirectional or unidirectional. In general, data conveyed over link 6 may be conveyed over any desired non-millimeter wave communications band (e.g., a communications band at frequencies less than 10 GHz). Data may be conveyed over link 8 at a higher bandwidth than data conveyed over link 6, for example (e.g., because link 8 is maintained at higher frequencies than link 6). This example is merely illustrative. In another suitable arrangement, link 6 may be formed using a wired (conductive) path. In yet another suitable arrangement, link 6 may be maintained over an intervening network such as the internet (e.g., link 6 may pass through intervening network devices such as network switches and routers). Communications link 6 may be omitted if desired.

Figure 2:
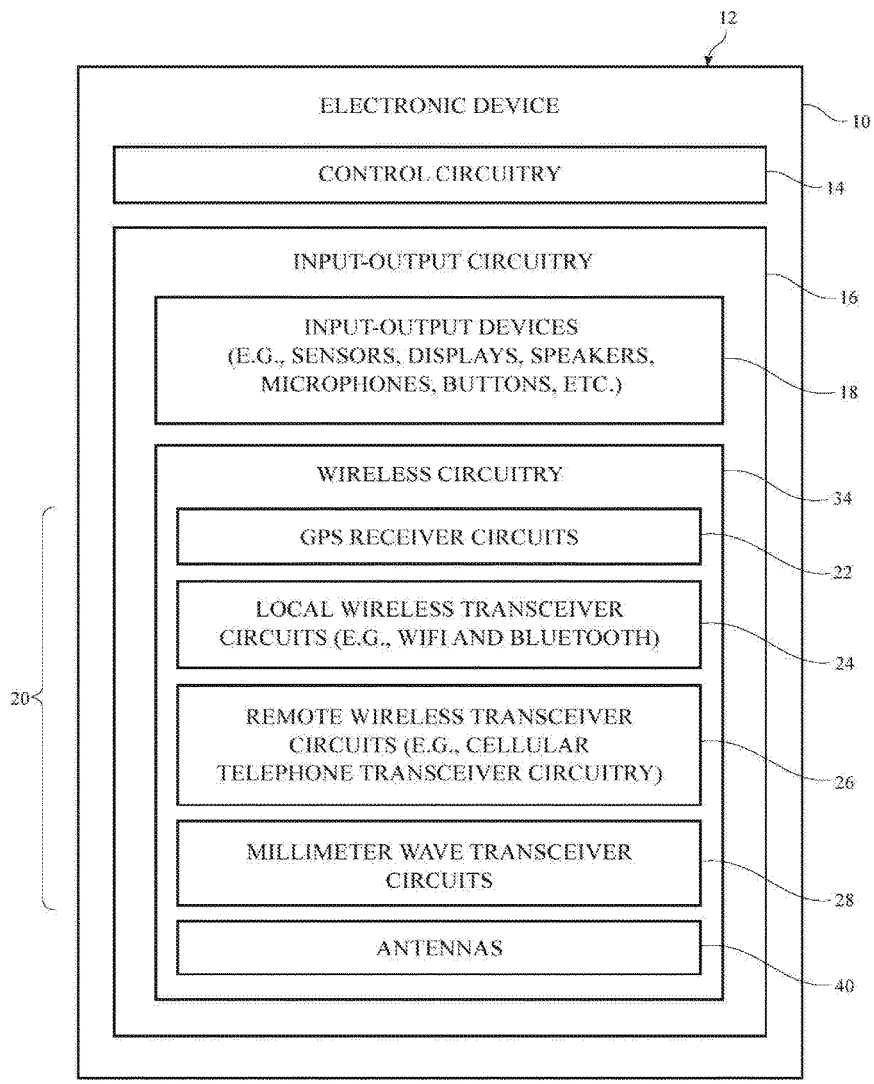
FIG. 2 is a schematic diagram of an illustrative electronic device with wireless communications circuitry in accordance with an embodiment.

A schematic diagram showing illustrative components that may be used in an electronic device such as electronic devices 10-1 and/or 10-2 of FIG. 1 is shown in FIG. 2. As shown in FIG. 2, device 10 (e.g., electronic device 10-1 and/or electronic device 10-2 of FIG. 1) may include storage and processing circuitry such as control circuitry 14. Control circuitry 14 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 14 may be used to control the operation of device 10. This processing circuitry may be based on one or more microprocessors, microcontrollers, digital signal processors, baseband processor integrated circuits, application specific integrated circuits, etc.

Control circuitry 14 may be used to run software on device 10, such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, etc.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include transceiver circuitry 20 for handling various radio-frequency communications bands. For example, circuitry 34 may include transceiver circuitry 22, 24, 26, and 28.

Transceiver circuitry 24 may be wireless local area network transceiver circuitry. Transceiver circuitry 24 may handle 2.4 GHz and 5 GHz bands for WiFi® (IEEE 802.11) communications and may handle the 2.4 GHz Bluetooth® communications band.

Circuitry 34 may use cellular telephone transceiver circuitry 26 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 26 may handle voice data and non-voice data.

Millimeter wave transceiver circuitry 28 (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry 28 may support IEEE 802.11ad communications at 60 GHz. Circuitry 28 may be formed from one or more integrated circuits (e.g., multiple integrated circuits mounted on a common printed circuit in a system-in-package device, one or more integrated circuits mounted on different substrates, etc.).

Wireless communications circuitry 34 may include satellite navigation system circuitry such as Global Positioning System (GPS) receiver circuitry 22 for receiving GPS signals at 1575 MHz or for handling other satellite positioning data (e.g., GLONASS signals at 1609 MHz). Satellite navigation system signals for receiver 22 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 28 may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include phased antenna arrays for handling millimeter wave communications.

As shown in FIG. 2, device 10 may include a housing such as housing 12. Housing 12, which may sometimes be referred to as an enclosure or case, may be formed of plastic, glass, ceramics, fiber composites, metal (e.g., stainless steel, aluminum, metallic coatings on a substrate, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Antennas 40 may be mounted in housing 12. Dielectric-filled openings such as plastic-filled openings may be formed in metal portions of housing 12 (e.g., to serve as antenna windows and/or to serve as gaps that separate portions of antennas 40 from each other).

In scenarios where input-output devices 18 include a display, the display may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. The display may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The display may be protected using a display cover layer such as a layer of transparent glass, clear plastic, sapphire, or other transparent dielectric. If desired, some of the antennas 40 (e.g., antenna arrays that may implement beam steering, etc.) may be mounted under an inactive border region of the display. The display may contain an active area with an array of pixels (e.g., a central rectangular portion). Inactive areas of the display are free of pixels and may form borders for the active area. If desired, antennas may also operate through dielectric-filled openings elsewhere in device 10.

Transmission line paths may be used to route antenna signals within device 10. For example, transmission line paths may be used to couple antenna structures 40 to transceiver circuitry 20. Transmission lines in device 10 may include coaxial cable paths, microstrip transmission lines, stripline transmission lines, edge-coupled microstrip transmission lines, edge-coupled stripline transmission lines, waveguide structures for conveying signals at millimeter wave frequencies, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. The antennas may be used together or one of the antennas may be switched into use while other antenna(s) are switched out of use. If desired, control circuitry 14 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40.

In some configurations, antennas 40 may include antenna arrays (e.g., phased antenna arrays to implement beam steering functions). For example, the antennas that are used in handling millimeter wave signals for extremely high frequency wireless transceiver circuits 28 may be implemented as phased antenna arrays. The radiating elements in a phased antenna array for supporting millimeter wave communications may be patch antennas, dipole antennas, or other suitable antenna elements. Transceiver circuitry 28 can be integrated with the phased antenna arrays to form integrated phased antenna array and transceiver circuit modules or packages if desired.

In devices such as handheld devices, the presence of an external object such as the hand of a user or a table or other surface on which a device is resting has a potential to block wireless signals such as millimeter wave signals. In addition, millimeter wave communications typically require a line of sight between antennas 40 and the antennas on an external device. Accordingly, it may be desirable to incorporate multiple phased antenna arrays into device 10, each of which is placed in a different location within or on device 10. With this type of arrangement, an unblocked phased antenna array may be switched into use and, once switched into use, the phased antenna array may use beam steering to optimize wireless performance. Similarly, if a phased antenna array does not face or have a line of sight to an external device, another phased antenna array that has line of sight to the external device may be switched into use and that phased antenna array may use beam steering to optimize wireless performance. Configurations in which antennas from one or more different locations in device 10 are operated together may also be used (e.g., to form a phased antenna array, etc.).

Figure 3:
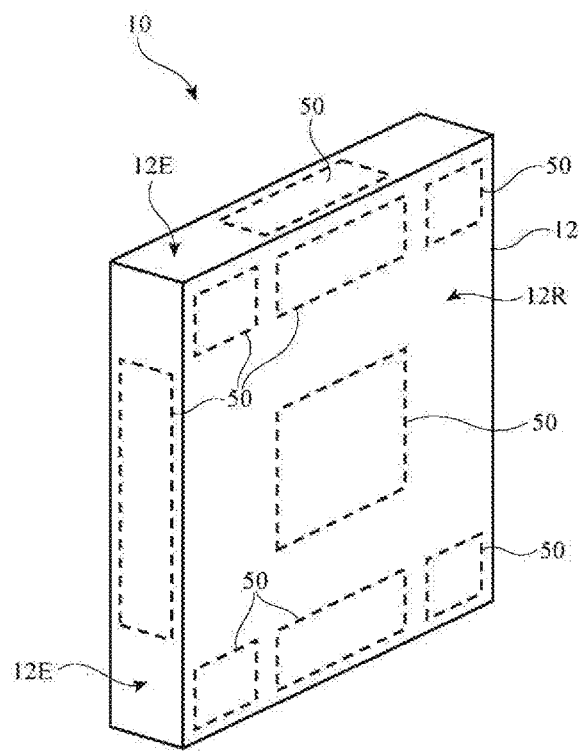
FIGS. 3 and 4 are perspective views of an illustrative electronic device showing locations at which phased antenna arrays for millimeter wave communications may be located in accordance with an embodiment.

FIG. 3 is a perspective view of electronic device 10 showing illustrative locations 50 in which antennas 40 (e.g., single antennas and/or phased antenna arrays for use with wireless circuitry 34 such as millimeter wave wireless transceiver circuitry 28) may be mounted in device 10. As shown in FIG. 3, housing 12 of device 10 may include rear housing wall 12R and housing sidewalls 12E. In one suitable arrangement, a display may be mounted to the side of housing 12 opposing rear housing wall 12R.

Antennas 40 (e.g., single antennas 40 or arrays of antennas 40) may be mounted at locations 50 at the corners of device 10, along the edges of housing 12 such as on sidewalls 12E, on the upper and lower portions of rear housing portion 12R, in the center of rear housing 12 (e.g., under a dielectric window structure such as plastic logo 52), etc. In configurations in which housing 12 is formed from a dielectric, antennas 40 may transmit and receive antenna signals through the dielectric, may be formed from conductive structures patterned directly onto the dielectric, or may be formed on dielectric substrates (e.g., flexible printed circuit board substrates) formed on the dielectric. In configurations in which housing 12 is formed from a conductive material such as metal, slots or other openings may be formed in the metal that are filled with plastic or other dielectric. Antennas 40 may be mounted in alignment with the dielectric (i.e., the dielectric in housing 12 may serve as one or more antenna windows for antennas 40) or may be formed on dielectric substrates (e.g., flexible printed circuit board substrates) mounted to external surfaces of housing 12.

Figure 4:
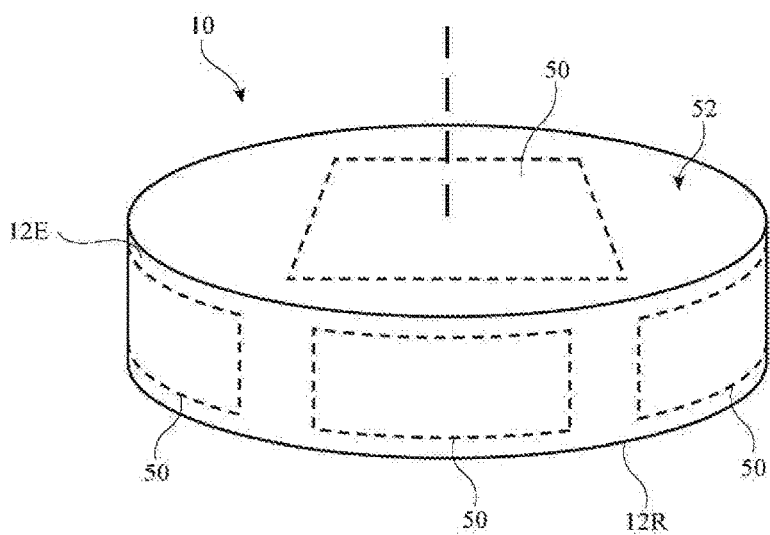

In the example of FIG. 3, rear housing wall 12R has a rectangular periphery. Housing sidewalls 12E surround the rectangular periphery of wall 12R and extend from wall 12R to the opposing face of device 10. In another suitable arrangement, device 10 and housing 12 may have a cylindrical shape. As shown in FIG. 4, rear housing wall 12R has a circular or elliptical periphery. Rear housing wall 12R may oppose surface 52 of device 10. Surface 52 may be formed from a portion of housing 12, may be formed from a display or transparent display cover layer, or may be formed using any other desired device structures. Housing sidewall 12E may extend between surface 52 and rear housing wall 12R. Antennas 40 may be mounted at locations 50 along housing sidewall 12E, on surface 50, and/or on wall 12R. By forming phased antenna arrays at different locations along wall 12E, on housing surface 52, and/or on housing surface 12R (e.g., as shown in FIGS. 3 and 4), the different phased antenna arrays on device 10 may collectively provide line of sight coverage to any point on a sphere surrounding device 10 (or on a hemisphere surrounding device 10 in scenarios where phased antenna arrays are only formed on one side of device 10).

The examples of FIGS. 3 and 4 are merely illustrative. In general, housing 12 and device 10 may have any desired shape or form factor. For example, rear housing wall 12R may have a triangular periphery, hexagonal periphery, polygonal periphery, a curved periphery, combinations of these, etc. Housing sidewall 12E may include straight portions, curved portions, stepped portions, combinations of these, etc. If desired, housing 12 may include other portions having any other desired shapes. The height of sidewall 12E may be less than, equal to, or greater than the length and/or width of housing rear wall 12R.

Figure 5:
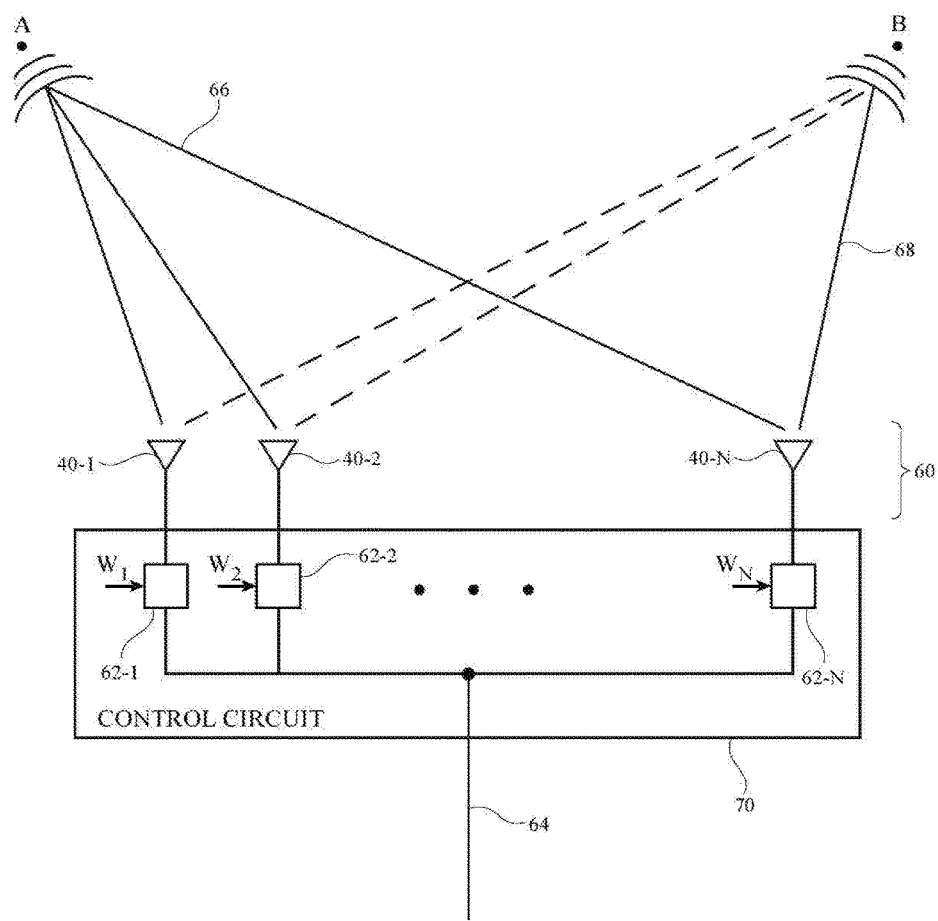
FIG. 5 is a diagram of an illustrative phased antenna array that may be adjusted using control circuitry to direct a beam of signals in accordance with an embodiment.

FIG. 5 shows how antennas 40 on device 10 may be formed in a phased antenna array. As shown in FIG. 5, an array 60 of antennas 40 may be coupled to a signal path such as path 64 (e.g., one or more radio-frequency transmission line structures, extremely high frequency waveguide structures or other extremely high frequency transmission line structures, etc.). Array 60 may include a number N of antennas 40 (e.g., a first antenna 40-1, a second antenna 40-2, an Nth antenna 40-N, etc.). Antennas 40 in phased antenna array 60 may be arranged in any desired number of rows and columns or in any other desired pattern (e.g., the antennas need not be arranged in a grid pattern having rows and columns). During signal transmission operations, path 64 may be used to supply signals (e.g., millimeter wave signals) from millimeter wave transceiver circuitry 28 to phased antenna array 60 for wireless transmission to external wireless equipment (e.g., over link 8 of FIG. 1). During signal reception operations, path 64 may be used to convey signals received at phased antenna array 60 from external equipment to millimeter wave transceiver circuitry 28.

The use of multiple antennas 40 in array 60 allows beam steering arrangements to be implemented by controlling the relative phases and amplitudes of the signals for the antennas. In the example of FIG. 5, antennas 40 each have a corresponding radio-frequency phase controller 62 (e.g., a first controller 62-1 coupled between signal path 64 and first antenna 40-1, a second controller 62-2 coupled between signal path 64 and second antenna 40-2, an Nth controller 62-N coupled between path 64 and Nth antenna 40-N, etc.).

Beam steering circuitry such as control circuitry 70 may use phase controllers 62 or any other suitable phase control circuitry to adjust the relative phases of the transmitted signals that are provided to each of the antennas in the antenna array and to adjust the relative phases of the received signals that are received by the antenna array from external equipment. The term "beam" or "signal beam" may be used herein to collectively refer to wireless signals that are transmitted and received by array 60 in a particular direction. The term "transmit beam" may sometimes be used herein to refer to wireless signals that are transmitted in a particular direction whereas the term "receive beam" may sometimes be used herein to refer to wireless signals that are received from a particular direction.

If, for example, control circuitry 70 is adjusted to produce a first set of phases on transmitted millimeter wave signals, the transmitted signals will form a millimeter wave frequency transmit beam as shown by beam 66 of FIG. 5 that is oriented in the direction of point A. If, however, control circuitry 70 adjusts phase controllers 62 to produce a second set of phases on the transmitted signals, the transmitted signals will form a millimeter wave frequency transmit beam as shown by beam 68 that is oriented in the direction of point B. Similarly, if control circuitry 70 adjusts phase controllers 62 to produce the first set of phases, wireless signals (e.g., millimeter wave signals in a millimeter wave frequency receive beam) may be received from the direction of point A as shown by beam 66. If control circuitry 70 adjusts phase controllers 62 to produce the second set of phases, signals may be received from the direction of point B, as shown by beam 68. Control circuit 70 may be controlled by control circuitry 14 of FIG. 2 or by other control and processing circuitry in device 10 if desired.

In one suitable arrangement, phase controllers 62 may each include radio-frequency mixing circuitry. Mixing circuitry in phase controllers 62 may receive signals from path 64 at a first input and may receive a corresponding signal weight value W at a second input (e.g., mixer 62-1 may receive a first weight $W_1$, mixer 62-2 may receive a second weight $W_2$, mixer 62-N may receive an Nth weight $W_N$, etc.). Weight values W may, for example, be provided by control circuitry 14 (e.g., using corresponding control signals) or form other control circuitry. The mixer circuitry may mix (e.g., multiply) the signals received over path 64 by the corresponding signal weight value to produce an output signal that is transmitted on the corresponding antenna. For example, a signal S may be provided to phase controllers 62 over path 64. Mixer 62-1 may output a first output signal $S*W_1$ that is transmitted on first antenna 40-1, mixer 62-2 may output a second output signal $S*W_2$ that is transmitted on second antenna 40-2, etc. The output signals transmitted by each antenna may constructively and destructively interfere to generate a beam of signals in a particular direction (e.g., in a direction as shown by beam 66 or a direction as shown by beam 68). Similarly, adjusting weights W may allow for millimeter wave signals to be received from a particular direction and provided to path 64. Different combinations of weights W provided to each mixer will steer the signal beam in different desired directions. If desired, control circuit 70 may actively adjust weights W provided to mixers 62 in real time to steer the transmit or receive beam in desired directions.

When performing millimeter wave communications, millimeter wave signals are conveyed over a line of sight path between antenna array 60 and external equipment. If the external equipment is located at location A of FIG. 5, circuit 70 may be adjusted to steer the signal beam towards direction A. If the external equipment is located at location B, circuit 70 may be adjusted to steer the signal beam towards direction B. In the example of FIG. 5, beam steering is shown as being performed over a single degree of freedom for the sake of simplicity (e.g., towards the left and right on the page of FIG. 5). However, in practice, the beam is steered over two degrees of freedom (e.g., in three dimensions, into and out of the page and to the left and right on the page of FIG. 5).

Figure 6:
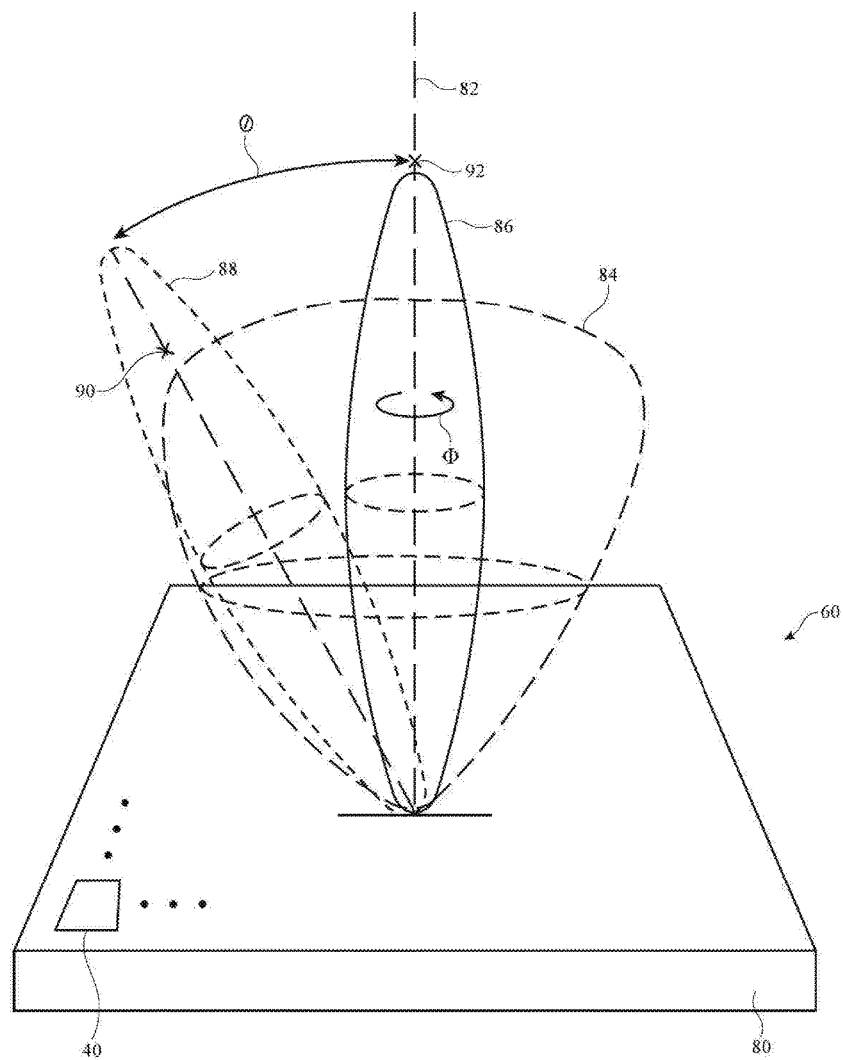
FIG. 6 is a perspective view of an illustrative phased antenna array that may steer a beam of signals in performing antenna sector scanning operations in accordance with an embodiment.

FIG. 6 is a perspective view showing how a given antenna array 60 may perform beam steering in three dimensions (e.g., over two degrees of freedom) to maintain line of sight with external equipment. As shown in FIG. 6, phased antenna array 80 includes an array of antennas 40 on dielectric substrate 80. Dielectric substrate 80 may be a printed circuit board (e.g., a rigid or flexible printed circuit) or other dielectric material (e.g., foam, ceramic, glass, sapphire, plastic, etc.). As an example, the antenna resonating elements of antennas 40 may be patterned onto a planar surface of dielectric substrate 80. Array 60 may include any desired number of antennas 40 (e.g., two antennas 40, three antennas 40, four antennas 40, sixteen antennas 40, between four and sixteen antennas 40, more than sixteen antennas 40, etc.).

The beam of wireless millimeter wave signals transmitted or received by array 60 may be steered to point in a desired direction (e.g., the beam may be placed in a desired orientation such as an orientation defined by angles φ and θ). In the example of FIG. 6, array 60 may have an axis 82 normal to the planar surface of array 40. By adjusting the phases of phase controllers 62 (FIG. 5), the beam may be steered by an azimuthal angle φ (e.g., an angle φ from 0 to 360 degrees) around normal axis 82 and by an inclination angle θ (e.g., an angle from −90 to 90 degrees) with respect to axis 82. This example is merely illustrative and, in general, any desired coordinate system may be used to represent the direction in which the beam is steered.

As the phases of phase controllers 62 are adjusted, the direction (i.e., the direction of the beam as defined by angles φ and θ) is steered to point in a desired direction (e.g., towards external millimeter wave communications equipment). Storage circuitry on device 10 may store phase settings (e.g., sets of phases to provide by each phase controller 62) to direct the beam in every possible or desired beam direction. The phase settings may, for example, be generated by calibrating device 10 (e.g., in a factory, manufacturing, or calibration system) over all possible angles to identify the phase settings required to point the beam in any desired direction. Control circuitry 14 may retrieve the corresponding phase settings to point the beam in a selected direction during normal millimeter wave communications operations.

In the example of FIG. 6, some possible millimeter wave beams handled by array 60 are illustrated using beam sectors such as sectors 84, 86, and 88 (sometimes referred to herein as antenna sectors or antenna beam sectors). Sectors 84, 86, and 88 may be polar-coordinate representations of the radiation pattern of array 60 under different phase configurations. Different phase configurations may provide the beam with different levels of angular spread (in addition to pointing the beam in different directions). For a given transmit power level, the greater angular spread that is provided to the beam, the less the gain is for the beam (e.g., because the power of the millimeter wave signals is spread across a greater amount of area with respect to array 60). Similarly, the less angular spread that is provided to the beam, the more gain is provided for the beam. The angular spread of sectors such as sectors 84, 86, and 88 may be indicative of the angular spread of the beam. Similarly, the maximum distance of sectors 84, 86, and 88 relative to array 60 may be indicative of the gain of the beam.

In the example of FIG. 6, phased antenna array 60 may configure phase/amplitude controllers 62 to provide the beam with a relatively large angular spread and low gain, as shown by sector 84, or may configure phase controllers 62 to provide the beam with a relatively small angular spread and high gain, as shown by sectors 86 and 88. Similarly, adjusting the configuration of controllers 62 may also point the beam in different desired directions. Sectors such as sectors 84, 86, and 88 may sometimes be used herein to describe the characteristics of millimeter wave beams that are transmitted or received by array 60 (e.g., in a particular direction, with a particular angular spread, and with a particular gain). The example of FIG. 6 is merely illustrative. In general, the sectors of array 60 such as sectors 88, 86, and 84 may have any desired shape (e.g., a shape characteristic of the radiation pattern of array 60 under different phase controller settings). If desired, device 10 may include multiple arrays 60 located at different locations (e.g., at multiple locations 50 as shown in FIGS. 3 and 4) to provide device 10 with a full sphere or hemisphere or any other desired area of antenna coverage around device 10.

In general, higher gain beams may allow for a higher average signal-to-noise ratio at the receiving device than lower gain beams. Similarly, higher average signal-to-noise ratios may allow for higher overall data throughput at the receiving device than lower average signal-to-noise ratios. Over time, device 10 may support an increasing number of data hungry applications and technologies having relatively high data throughput requirements. In order to support such applications and technologies having high data throughput requirements, device 10 may perform millimeter wave communications using relatively high gain beams such as the beams associated with sectors 86 and 88 of FIG. 6. When an external device is at location 92, a beam such as a beam within sector 86 may be used to communicate with the external device with a relatively high data throughput (e.g., over a high data rate link such as millimeter wave link 8 of FIG. 1 having a data rate of 1 MBps or higher). However, if the external device moves away from location 92, the external device may move out of the relatively narrow area of coverage (i.e., the relatively narrow angular spread) of sector 86. If care is not taken, this may generate errors in the data conveyed between device 10 and the external device and/or the wireless connection may be dropped.

In order to maintain millimeter wave link 8 with the external device as the external device moves over time, once the external device moves out of the area of coverage of the beam (e.g., out of the area of angular spread of the corresponding sector), control circuitry 14 on device 10 may steer the beam towards the new location of the external device. In the example of FIG. 6, the external equipment may move from location 92 to location 90. Control circuitry 14 may thereby adjust phase controllers 62 to steer the beam towards location 90 as shown by sector 88. Data may then continue to be conveyed between the devices without introducing errors in the data or dropping the wireless link.

In practice, device 10 may have no knowledge of the new (current) location of the external device immediately after the external device moves out of the region of coverage of the beam. In order to determine where to steer the beam to continue communications with the external device, device 10 may perform a beam scanning operation (sometimes referred to as beam scanning, beam searching, sector scanning, or sector searching). In one scenario, the beam scanning operation involves adjusting phase controllers 62 to sweep the beam over all possible directions. In this scenario, array 60 scans the beam over all combinations of azimuthal angle φ (e.g., from 0 to 360 degrees) and inclination angle θ (e.g., from −90 to 90 degrees). At each direction (e.g., each combination of angles φ and θ), control circuitry 14 gathers wireless performance metric data associated with the quality of link 8 between device 10. In scenarios where multiple arrays 60 are formed on device 10, each of the arrays is used to scan the beam over all possible angles around device 10 (e.g., from 0 to 360 degrees around axis 82 and from 0 to 360 degrees around along direction θ or some subset of these angles). After sweeping over all possible directions using all possible arrays, control circuitry 14 processes the gathered wireless performance metric data to identify the direction in which the external device is located. Performing beam scanning operations in this way may consume an excessive amount of time and processing resources if the external device moves during operation (e.g., because the beam must be steered to each possible direction and corresponding wireless performance metric data must be gathered and analyzed before the sector to use is determined). This may also lead to an excessive average number of data errors over time and/or to the wireless link being dropped, as an excessive amount of time is spent with the beam steered away from the current location of the external device.

Figure 7:
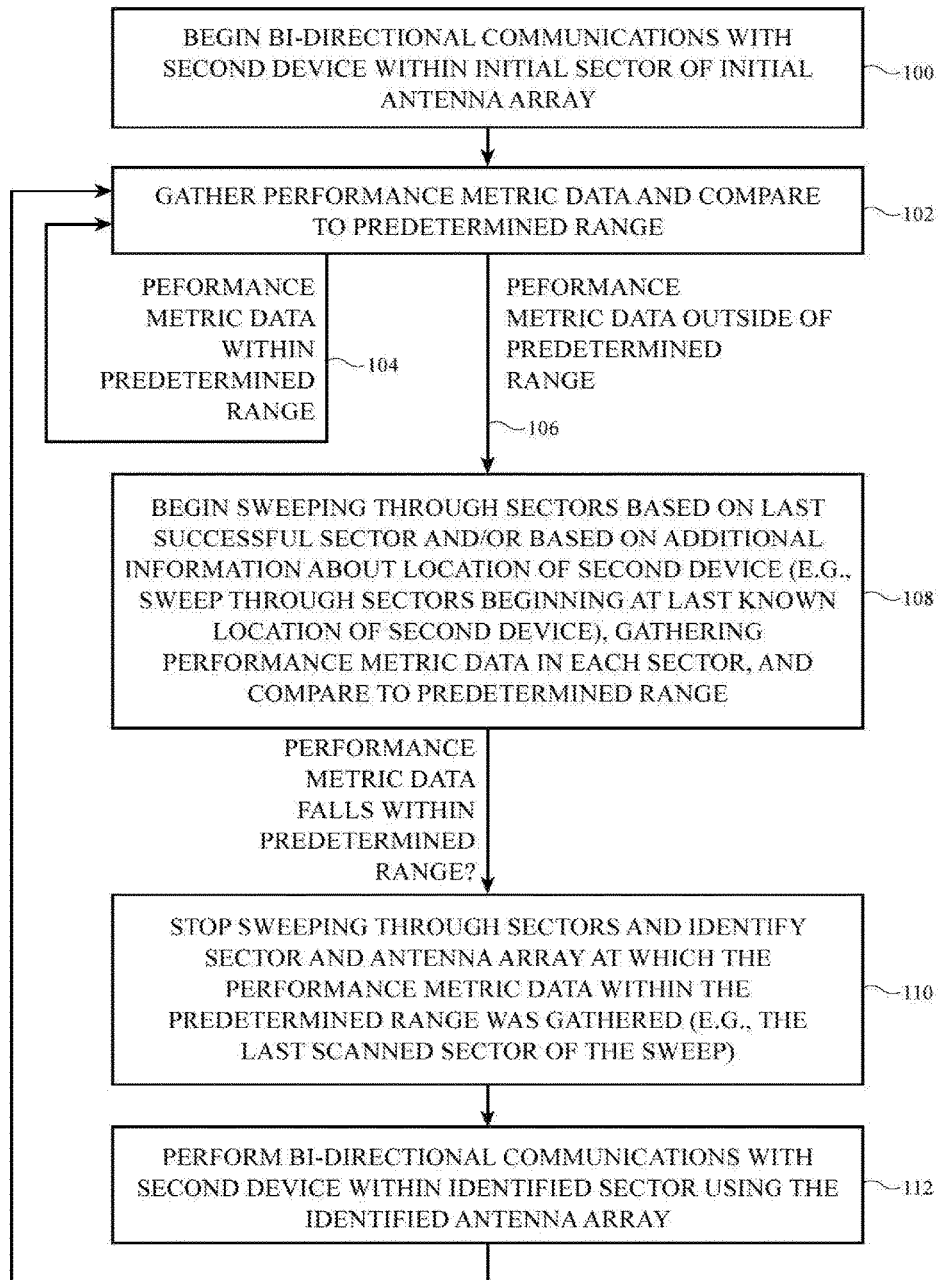
FIGS. 7 and 8 are flow charts of illustrative steps that may be processed by a first electronic device in performing antenna sector scanning operations based on information about the location of a second electronic device in accordance with an embodiment.

In order to reduce the amount of time and processing resources required to steer the beam towards the new location of the external device, device 10 may perform beam scanning operations based on information about the location (position) of the external device. For example, device 10 may perform beam scanning based on the last known location of the external device (e.g., based on already-known or a priori information about the location history of the external device) and/or based on additional information about the location of the external device such as sensor data. FIG. 7 is a flow chart of illustrative steps that may be processed by an electronic device in performing beam scanning operations based on information about the location of the external device. The steps of FIG. 7 may be performed by an electronic device 10 such as device 10-1 in communicating with an external device such as device 10-2 of FIG. 1, for example. Device 10-1 and 10-2 may each include one or more phased antenna arrays (e.g., device 10-1 may include one or more phased arrays 60 of antennas 40).

At step 100, device 10-1 may begin performing bi-directional communications with external device 10-2 over millimeter wave link 8. For example, device 10-1 may transmit wireless data to device 10-2 over millimeter wave link 8 (e.g., a stream or sequence of data packets at millimeter wave frequencies) and may receive wireless data from device 10-2 over millimeter wave link 8. Data received from device 10-2 may include acknowledgement data packets (e.g., data packets acknowledging receipt at device 10-1 of corresponding data packets transmitted by device 10-2), handshake data packets, or any other desired data, as an example. Device 10-1 may perform millimeter wave communications with device 10-2 using an initial array 60 with a millimeter wave signal beam pointed in an initial direction (e.g., within an initial sector pointed towards the location of device 10-2). The initial sector and array may be determined by performing beam scanning over all possible directions and then identifying a sector within which device 10-2 is located, as one example. In another example, the initial sector and array may be identified using additional information about the location of device 10-2 such as sensor data.

At step 102, device 10-1 may continue to transmit and/or receive wireless data over millimeter wave link 8 and may gather wireless performance metric data associated with millimeter wave link 8. The wireless performance of devices 10-1 and 10-2 (e.g., the quality of millimeter wave link 8) may be characterized by one or more wireless performance metrics (e.g., radio-frequency or extremely high frequency performance metrics). Device 10-1 (e.g., control circuitry 14, baseband processor circuitry in wireless circuitry 34, or other circuitry on device 10-1) may obtain data associated with wireless performance metrics. For example, device 10-1 may generate wireless performance metric data and/or may receive wireless performance metric data from electronic device 10-2 (e.g., over millimeter wave link 8 and/or non-millimeter wave link 6 of FIG. 1).

As examples, device 10-1 may obtain wireless performance metric data associated with wireless performance metrics such as received power, receiver sensitivity, receive band noise (e.g., a receive band noise floor voltage level), frame error rate, bit error rate, packet error rate, channel quality measurements based on received signal strength indicator (RSSI) information, adjacent channel leakage ratio (ACLR) information (e.g., ACLR information in one or more downlink frequency channels), channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from device 10-2, information on whether a network access procedure has succeeded, information about how many re-transmissions are being requested over link 8 between devices 10-1 and 10-2, information on whether a loss of signaling message has been received, information on whether paging signals have been successfully received, Error Vector Magnitude (EVM), output power, spectral parameters, performance metrics associated with radio-frequency power amplifier circuitry on devices 10-1 or 10-2 such as amplifier compression and efficiency, any desired combination of these performance metrics, rates of change over time of these performance metrics, and other information that is reflective of the performance of wireless circuitry on device 10-1 and/or device 10-2. In general, wireless performance metric data may include data associated with any desired performance metric for the transmission or reception of millimeter wave signals by wireless communications circuitry 34 and/or device 10-2. Wireless performance metric data may, for example, include performance metric values measured for a given performance metric (e.g., measured packet error rate values, measured power level values, measured SNR values, measured ACLR values, measured receive band noise floor level values, measured RSSI values, etc.).

Control circuitry 14 may store gathered wireless performance metric data on storage circuitry (e.g., within one or more data structures stored on memory, etc.). Control circuitry 14 may periodically or continuously compare the gathered wireless performance metric data to a predetermined range of acceptable performance metric data values. The predetermined range of acceptable performance metric values may be defined by one or more wireless performance metric threshold values (e.g., the range of acceptable performance metric values may be less than a maximum performance metric threshold value and/or greater than a minimum performance metric threshold value). The predetermined range of acceptable values need not have both maximum and minimum threshold values. For example, the predetermined range of acceptable values may include any packet error rate values less than a maximum threshold packet error rate value, any receive power level value greater than a minimum receive power level value, etc. The predetermined range of acceptable values (e.g., the corresponding threshold values defining the range) may be determined by carrier requirements, design requirements, engineering requirements, government requirements, or any other desired requirements or standards for the radio-frequency performance of device 10-1.

Wireless performance metric data within the predetermined range of acceptable values may be indicative of satisfactory link quality for millimeter wave link 8. Wireless performance metric data outside of the predetermined range of acceptable values may be indicative of unsatisfactory link quality for millimeter wave link 8. Control circuitry 14 may periodically or continuously compare the gathered wireless performance metric data to the predetermined range of acceptable performance metric data values. If the gathered performance metric data lies within the predetermined range, electronic device 10-1 may continue to perform millimeter wave communications with device 10-2 and may continue to gather wireless performance metric data, as shown by path 102. This may be indicative of link 8 having satisfactory link quality as a result of external device 10-2 remaining within the initial sector of the initial array, for example.

If external device 10-2 moves out of the initial sector, the beam will no longer be pointed at external device 10-2 and the link quality will deteriorate. Device 10-1 may identify this deterioration when the gathered performance metric data fall outside of the predetermined range. If the gathered performance metric data falls outside of the predetermined range, processing may proceed to step 108 as shown by path 106.

As an example, control circuitry 14 may compare packet error rates measured by device 10-1 and/or device 10-2 for data conveyed over link 8 to a maximum packet error rate threshold value. If the measured packet error rate rises above the maximum packet error rate threshold value (e.g., indicative of an excessive number of data packets for link 8 being dropped as a result of device 10-2 moving out of the angular coverage of the initial beam sector), processing may proceed to step 108 as shown by path 106 to re-direct the beam towards the new (current) position of device 10-2.

Once device 10-2 has moved outside of the initial sector, device 10-1 may perform sector scanning based on the location of device 10-2 (e.g., based on information about the previous, current, or predicted location of device 10-2). At step 108, device 10-1 may begin sweeping (scanning) through different beam angles (sectors) based on the last known location of device 10-2 and/or based on additional information about the location of device 10-2. The last known location of device 10-2 may be, for example, the last sector for which successful communications were performed over link 8 (e.g., the last sector for which performance metric data within the predetermined range was measured). The last sector for which successful communications were performed over link 8 may sometimes be referred to herein as the last successful sector. Device 10-1 may gather performance metric data at each of the sectors in the sweep and may compare the gathered performance metric data to the predetermined range of acceptable values at each of the sectors in the sweep (e.g., prior to moving on to the next sector in the sweep). The performance metric data may be gathered in response to transmitted and/or received millimeter wave signals in each corresponding sector (e.g., millimeter wave data packets or probe/test signals used specifically for the purpose of identifying the location of device 10-2). The sector sweep may involve sweeping through sectors of multiple different antenna arrays 60 (e.g., in scenarios where device 10-2 has moved out of the area of coverage of the initial array).

In one suitable arrangement, the additional information about the location of device 10-2 may include sensor data generated by sensor circuitry on device 10-1. The sensor data may identify the updated (current) location of external device 10-2. For example, camera circuitry on device 10-1 may identify that device 10-2 is at a particular location relative to device 10-1. In another example, infrared range finding sensor circuitry on device 10-1 identifies the location of device 10-2. Sensor data from one sensor device or from combinations of sensor devices on device 10-1 may be used to identify the location of device 10-2.

In another suitable arrangement, sensor circuitry on external device 10-2 or sensor circuitry on another device in proximity to devices 10-1 and/or 10-2 may gather sensor data that identifies the location of device 10-2. For example, satellite navigation circuitry on device 10-2 may identify the location of device 10-2 using a satellite triangulation method or other methods. If desired, other more other more precise methods of device triangulation may be used to identify the location of device 10-2. For example, multiple devices in the vicinity of device 10-2 (e.g., other electronic devices, wireless access point devices, wireless base station devices, etc.) may use sensor data and/or transmitted wireless signals to triangulate the location of device 10-2. Sensor data or satellite data identifying the location of device 10-2 may be transmitted to device 10-1 over millimeter wave link 8 and/or optional non-millimeter wave link 6.

Device 10-1 may begin sweeping through sectors based on the last known location of device 10-2 by sweeping through sectors around the last successful sector (e.g., beginning at the last successful sector and progressively moving to sectors farther away from the last successful sector). Device 10-2 may have a higher probability of being located within a sector adjacent to or near to the last successful sector than sectors farther away from the last successful sector, for example (e.g., because it is statistically more likely that device 10-2 moved a shorter distance than a longer distance in a given time). Device 10-1 may begin sweeping through sectors based on the additional information about the location of device 10-2 by identifying the location of device 10-2 using sensor data or satellite data that identifies the location of device 10-2 and beginning sweeping at and around that sector. In general, sensor data, satellite data, and information about the last successful sector may be combined in any desired manner in beginning and executing the sector sweep.

Once control circuitry 14 identifies that the gathered performance metric data has fallen within the predetermined range of acceptable performance metric values (e.g., once the sweep has reached the sector in which device 10-2 is located), processing may proceed to step 110. At step 110, device 10-1 may stop sweeping through sectors. Device 10-1 may identify the sector and corresponding array 60 at which the performance metric data within the acceptable range was gathered (e.g., the last sector of the sweep prior to stopping the sweep). The identified sector may, for example, be the sector to which the active antenna array is steered when the sweep is stopped.

At step 112, control circuitry 14 may control the active antenna array to remain steered to the identified sector and device 10-1 may perform bi-directional communications with device 10-2 within the identified beam sector using the corresponding array 60. Processing may subsequently loop back to step 102 as shown by path 114 to continue gathering performance metric data and comparing the performance metric data to the predetermined range in the current sector. Once device 10-2 moves out of the current sector (e.g., once the gathered performance metric again falls out of the range of acceptable values), device 10-1 may then repeat this process to steer the beam to the updated location of device 10-2.

By sweeping through sectors based on the last successful sector (e.g., beginning the sweep at the last successful sector and progressively moving away from the last successful sector) and/or based on additional sensor or satellite data and ending the sweep as soon as acceptable performance metric data is gathered (e.g., as soon as the beam is steered to the current location of device 10-2), bi-directional communications may be re-established in less time than in scenarios where all possible beam sectors are swept through prior to processing the performance metric data. This may significantly reduce the average overall error rate and increase the average data throughput associated with millimeter wave link 8 over time relative to scenarios where all sectors are swept prior to identifying the sector in which device 10-2 is located, for example.

The steps of FIG. 7 may be performed by device 10-1 in transmitting and/or receiving millimeter wave signals (e.g., because link 8 is bidirectional). The steps of FIG. 7 may also be by device 10-2 prior to, concurrent with, or after device 10-1 performs the steps of FIG. 7 (e.g., because the antenna arrays on both devices need to be directed towards the other device even as the devices move over time).

Figure 8:
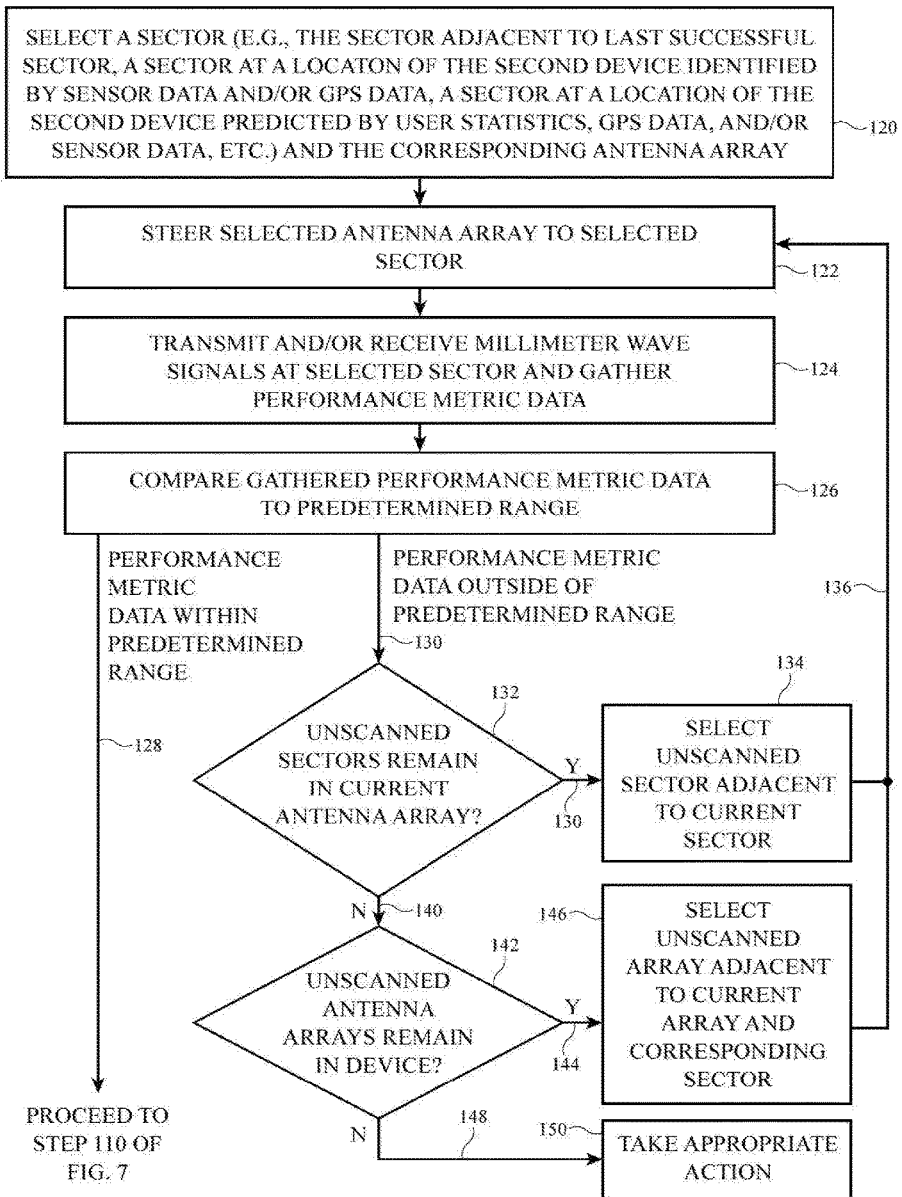

FIG. 8 is a flow chart of illustrative steps that may be performed by device 10-1 in performing beam scanning based on information about the location of device 10-2. The steps of FIG. 8 may, for example, be performed while processing step 108 of FIG. 7.

At step 120, control circuitry 14 may select a sector (e.g., a beam direction and corresponding angular spread) and the corresponding antenna array for processing based on the last successful sector (e.g., the last successful beam direction and corresponding angular spread) and/or based on additional information about the location of device 10-2. For example, control circuitry 14 may select the last successful sector or a sector that is adjacent to the last successful sector (e.g., because there is a higher probability that device 10-2 only moved from the last successful sector to an adjacent sector than to any other sector). In another suitable arrangement, control circuitry 14 may select a sector that includes the location of device 10-2 as identified by sensor data and/or GPS data. As another example, control circuitry 14 may use sensor data, GPS data, and/or statistics about the typical behavior (e.g., location over time) of device 10-2 to predict a sector in which device 10-1 will be located and may select that sector for processing. In this example, sensor data and/or GPS data may identify a location and velocity of device 10-2 and/or device 10-1 and may select a sector in which device 10-2 is expected to be located at a given time based on the location and velocity information. In scenarios where the predicted sector is selected based on statistics about the typical behavior of device 10-2, the selected sector may be a sector in which device 10-2 is likely to be located at a given time, for example.

This is merely illustrative and, in general, any desired combination of information about the last successful sector, sensor data, satellite data, and statistics about the location of device 10-2 may be used to select the sector. As one example, if the orientation of device 10-1 changes over time, device 10-2 may no longer remain in the active sector of the active array even if the position of device 10-2 relative to device 10-1 has not changed. In this scenario, control circuitry 14 may use device orientation sensor circuitry such as an inertial measurement unit to identify the change in orientation of device 10-1. Inertial measurement units may include, for example, accelerometers that measure the orientation of the Earth's gravitational field and that can therefore measure the orientation and motion of device 10-1, may include gyroscopes (gyroscopic sensors) that measure motion device 10-1 (e.g., angular motion), and/or sensors such as compasses (e.g., magnetic sensors, sometimes referred to as magnetometers) that measure orientation and that can therefore measure device movement. Inertial measurement units (e.g., microelectromechanical systems sensors) that include 3-axis accelerometer sensors, 3-axis gyroscopes, and 3-axis compasses may be used, for example.

The device orientation sensor circuitry may generate device orientation data indicative of the orientation or motion of device 10-1. Control circuitry 14 may use the device orientation data to identify a change in orientation of device 10-1. Control circuitry 14 may identify a sector and corresponding array that overlaps with the location of device 10-2 based on the orientation data and/or information about the last successful sector. For example, if device 10-1 determines that device 10-1 has rotated by 180 degrees, control circuitry 14 may select a sector and corresponding array that covers an area relative to device 10-1 that is shifted 180 degrees away from the last successful sector for processing. This sector may serve as the sector selected at step 120 of FIG. 8 if desired (e.g., device 10-1 may sweep over sectors beginning at that sector and moving to progressively farther sectors until device 10-2 is found). If desired, other data such as camera data or GPS data may be used in addition to the orientation used to identify the sector (e.g., in scenarios where the position of device 10-2 relative to device 10-1 changes in addition to device 10-1 changing orientations).

At step 122, control circuitry 14 may control the selected array 60 to steer the millimeter wave beam to the selected sector (e.g., control circuitry 14 may steer the beam in the direction of or may place the beam in an orientation of the selected sector). For example, control circuitry 14 may retrieve a set of phase settings for phase controllers 62 that are predetermined to point the millimeter wave beam to the selected sector from memory and may control phase control circuitry 62 to implement the retrieved set of phase settings.

At step 124, the selected array 60 may transmit and/or receive millimeter wave signals within the selected sector. The millimeter wave signals may include wireless probe or test signals, for example. Control circuitry 14 may gather wireless performance metric data using the transmitted and/or received millimeter wave signals.

At step 126, control circuitry 14 may compare the gathered wireless performance metric data to the predetermined range of acceptable performance metric data values. If the gathered wireless performance metric data lies within the predetermined range, processing may proceed to step 110 of FIG. 7. If the gathered wireless performance metric data is outside of the predetermined range (e.g., greater than a maximum threshold value or less than a minimum threshold value of the predetermined range), processing may proceed to step 132 as shown by path 130.

At step 132, control circuitry 14 may determine whether un-scanned sectors (e.g., sectors that have not yet been included in the current sector sweep) remain for processing in the selected array 60. For example, each array may have a given number of sectors that cover the full field of view of that array (e.g., that cover 360 degrees of angle φ and 180 degrees of angle θ of FIG. 6). If un-scanned sectors of the selected array remain, processing may proceed to step 134 as shown by path 138.

At step 134, control circuitry 14 may select an un-scanned sector adjacent to (e.g., immediately adjacent to) the currently selected sector of the current array for processing. As an example, in scenarios where each sector has a maximum width of 10 degrees and the current sector is located at an angle θ of 45 degrees and an angle φ of 45 degrees, the selected un-scanned sector may be located at an angle θ of 35 degrees and an angle φ of 45 degrees, at an angle θ of 45 degrees and an angle φ of 55, at an angle θ of 35 degrees and an angle φ of 35 degrees, or at any other desired angle. Each sector may partially overlap with the adjacent sector (e.g., the selected un-scanned sector may be located at an angle θ between 35 and 45 degrees and an angle φ of 45 degrees, at an angle θ of 45 and an angle φ between 45 and 55 degrees, at an angle θ between 35 and 45 degrees and an angle φ between 35 and 45 degrees, etc.) or there may be no angular overlap between each adjacent sector. In another suitable example, when the beam is pointing in a first direction (e.g., when the beam is placed in a first orientation), steering the beam to an adjacent sector may involve steering the beam in a second direction or orientation that is oriented at an angle of three degrees with respect to the first direction, five degrees with respect to the first direction, ten degrees with respect to the first direction, twenty degrees with respect to the first direction, or at any other desired angle less than forty five degrees with respect to the first direction (e.g., an angle that is less than thirty degrees with respect to the first direction).

Processing may subsequently loop back to step 122 as shown by path 136 to gather performance metric data while steered to the newly selected sector. In this way, device 10-1 may sweep through sectors beginning at the sectors closest to the last successful sector (or beginning at the sectors at or near to the sensed or predicted location of device 10-2) and moving progressively farther away from that sector. If no un-scanned sectors of the selected array remain, processing may proceed to step 142 as shown by path 140.

At step 142, control circuitry 14 may determine whether un-scanned arrays 60 (e.g., arrays that have not yet been included in the current sector sweep) remain on device 10-1 for processing. For example, device 10-1 may have four arrays 60 that provide full coverage around device 10 (e.g., that provide a full sphere, hemisphere, cylinder, or other area of coverage around device 10-1). If un-scanned arrays remain, processing may proceed to step 146 as shown by path 144.

At step 146, control circuitry 14 may select an un-scanned array adjacent to the currently selected array for processing. Control circuitry 14 may select a sector of the newly-selected un-scanned array for processing. The selected sector may, for example, be a sector closest to the last scanned sector of the previously scanned array. Processing may subsequently loop back to step 122 as shown by path 136 to scan over each of the sectors of the newly-selected array and any remaining arrays 60 until the location of device 10-2 is found. If no un-scanned arrays remain, processing may proceed to step 150 as shown by path 148.

At step 150, device 10-1 may take appropriate action. For example, device 10-1 may begin sweeping over all possible sectors and arrays, processing may return to step 120, device 10-1 may stop attempting to communicate over link 8, a notification or alert may be issued to a user of device 10-1 and/or 10-2, etc.

Figure 9:
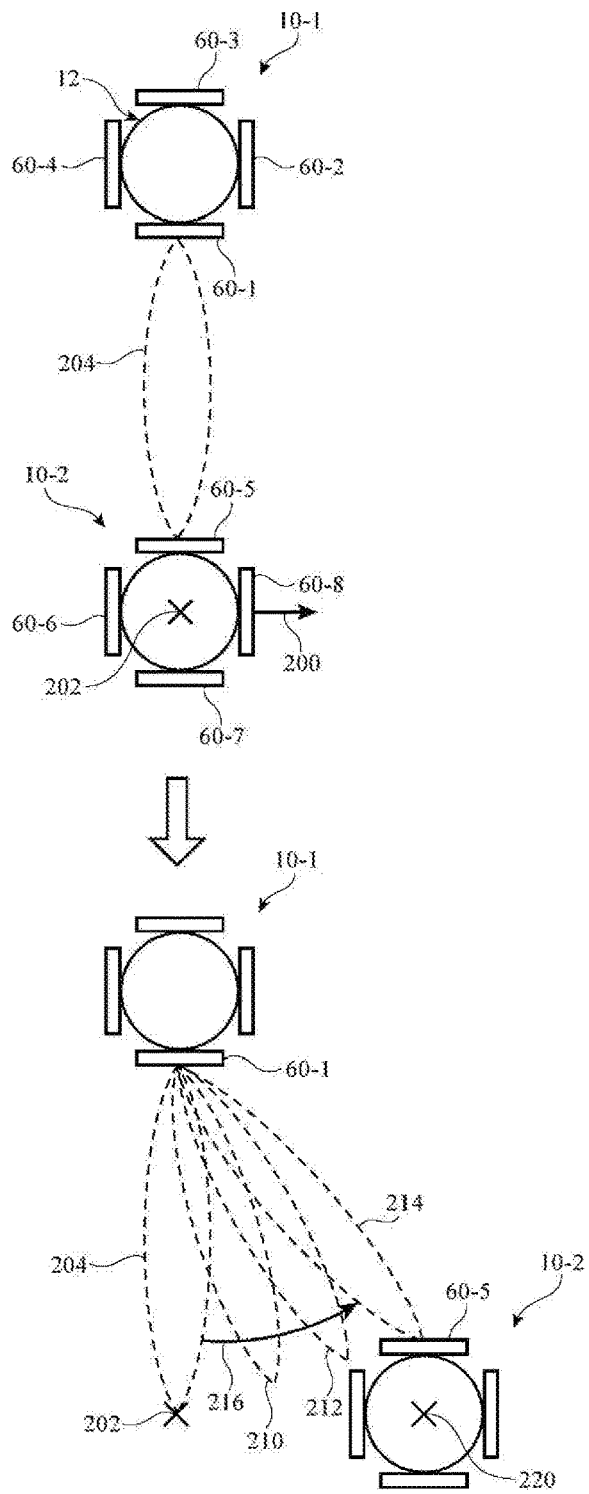
FIG. 9 is a top-down diagram showing how an illustrative electronic device may perform antenna sector scanning operations over a single phased antenna array in accordance with an embodiment.

FIG. 9 is a top-down diagram showing how devices 10-1 and 10-2 may perform sector sweeping operations to maintain millimeter wave link 8 as device 10-2 moves over time. As shown in FIG. 9, device 10-1 may include multiple phased antenna arrays 60 formed on different sides of housing 12 (e.g., a first antenna array 60-1 on a first side of housing 12, a second antenna array 60-2 on a second side of housing 12, a third antenna array 60-3 on a third side of housing 12, a fourth side of housing 12 of fourth array 60-4). Arrays 60-1, 60-2, 60-3, and 60-4 may provide full antenna coverage around all sides of device 10-1, for example.

Device 10-2 may include multiple phased arrays 60 formed on different sides of device 10-2 (e.g., a first array 60-5, a second array 60-6, a third array 60-7, and a fourth array 60-8). Arrays 60-5, 60-6, 60-7, and 60-8 may provide full antenna coverage around all sides of device 10-2, for example. The example of FIG. 9 is merely illustrative. In general, devices 10-1 and 10-2 may have any desired form factor and any desired number of arrays 60 (e.g., one array, two arrays, three arrays, four arrays, more than four arrays, etc.). Antenna arrays 60 may be formed on other sides (e.g., the top or bottom) of devices 10-1 and 10-2 or in any other desired configuration if desired.

As shown in FIG. 9, device 10-2 is at location 202 with a line of sight between array 60-5 and array 60-1 on device 10-1. Devices 10-1 may steer the beam of antenna array 60-1 to sector 204 in which array 60-5 of device 10-2 is located (e.g., the beam may be steered in the direction of sector 204 or placed in an orientation of sector 204). Similarly, device 10-2 may steer antenna array 60-5 to sector 204. Devices 10-1 and 10-2 may subsequently perform bidirectional millimeter wave communications by conveying signals between arrays 60-1 and 60-5 over link 8 (e.g., while processing steps 100 and 102 of FIG. 7).

Device 10-2 may move from location 202 to location 220 relative to device 10-1 as shown by arrow 200. Once device 10-2 has moved to location 220, device 10-2 is no longer within sector 204 of array 60-1. Device 10-1 may subsequently identify that device 10-2 has moved from sector 204 (e.g., by gathering performance metric data that lies outside of the predetermined range while processing step 102 of FIG. 7). Rather than sweeping over all possible sectors around device 10-1, device 10-1 may steer array 60-1 to sector 210 adjacent to sector 202 (e.g., while processing steps 120 and 122 of FIG. 8). Device 10-1 may gather performance metric data in response to millimeter wave signal transmission and/or reception while steered to sector 210 (e.g., while processing step 124 of FIG. 8). Device 10-1 may identify that device 10-2 is not within sector 210 (e.g., by gathering performance metric data that lies outside of the predetermined range while processing step 126 of FIG. 8). Device 10-1 may subsequently steer array 60-1 to adjacent sector 212 (e.g., while processing step 134 and looping back to step 122 of FIG. 8). This process may be repeated until device 10-1 steers array 60-1 to sector 214, which overlaps with location 220 of device 10-2. Device 10-1 may identify that device 10-2 is located within sector 214 (e.g., by gathering performance metric data that lies within the predetermined range while processing step 126 of FIG. 8) and the sweep may be stopped (e.g., while processing step 110 of FIG. 7). Similar operations may be performed by device 10-2 to identify and steer to sector 214 within which device 10-1 is located. Bidirectional communications between devices 10-1 and 10-2 may resume until one of the devices moves out of sector 214.

In this way, device 10-1 may sweep through sectors beginning at the last known successful sector (i.e., sector 204) and moving to sectors progressively farther away from sector 204 (e.g., as shown by arrow 216) until device 10-2 is found. Performing sector sweeping in this way may consume significantly less time than sweeping over all possible sectors and then processing performance metric data for each sector to identify the location of device 10-2. This example is merely illustrative. If desired, each possible sector adjacent to last successful sector 204 may be swept through before steering the beam to farther sectors such as sectors 212 and 214. In another suitable arrangement, there may be one or more intervening sectors between each sector of the sweep. The sector sweep may be performed in any desired direction.

In the example of FIG. 9, device 10-2 moves between two locations that are both within the coverage area of the same array 60-1. In some scenarios such as when device 10-1 is initially located near to the edges of the coverage area of a given array, device 10-1 may move to a location that is no longer within the coverage area of the given array. In these scenarios, device 10-1 may sweep through sectors of additional arrays 60 until device 10-2 is found.

Figure 10:
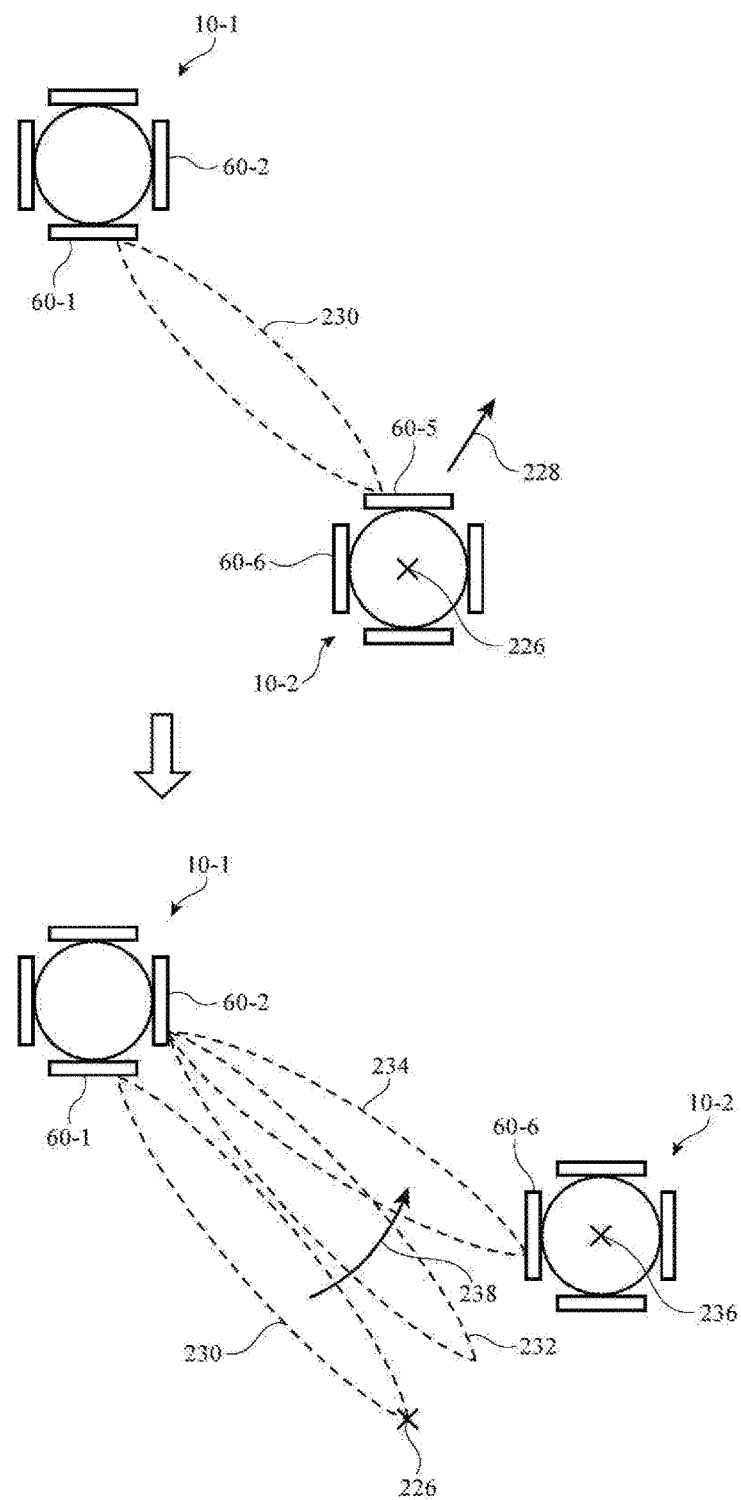
FIG. 10 is a top-down diagram showing how an illustrative electronic device may perform antenna sector scanning operations over multiple phased antenna arrays in accordance with an embodiment.

FIG. 10 is a top-down diagram showing how devices 10-1 and 10-2 may perform sector searching by sweeping over sectors of different arrays. As shown in FIG. 10, device 10-2 may initially be at location 226. Device 10-1 may steer the beam of antenna array 60-1 to sector 230 in which array 60-5 of device 10-2 is located. Similarly, device 10-2 may steer antenna array 60-5 to sector 230. Devices 10-1 and 10-2 may subsequently perform bidirectional millimeter wave communications by conveying signals between arrays 60-1 and 60-5 over link 8.

Device 10-2 may move from location 226 to location 236 relative to device 10-1 as shown by arrow 228. Once device 10-2 has moved to location 236, device 10-2 is no longer within the coverage area of any sector of array 60-1. Device 10-1 may subsequently identify that device 10-2 has moved out of sector 230 (e.g., by gathering performance metric data that lies outside of the predetermined range while processing step 102 of FIG. 7). Rather than sweeping over all possible sectors, device 10-1 may steer to an adjacent sector such sector 232. Since sector 232 lies outside of the coverage area of array 60-1, device 10-1 may use second array 60-2 to steer to sector 232. This example is merely illustrative. In another suitable arrangement, device 10-1 may steer over all sectors of array 60-1 (e.g., beginning with the sector of array 60-1 adjacent to sector 230), may determine that device 10-2 is not within the coverage area of array 60-1 (e.g., because the gathered performance metric data does not fall within the acceptable range for any sector of array 60-1), and may subsequently select adjacent array 60-2 for scanning (e.g., while processing step 146 of FIG. 8). The first sector of adjacent array 60-2 may be, for example, a sector adjacent to the last-scanned array (e.g., sector 232) or any other desired sector.

Device 10-1 may gather performance metric data in response to signal transmission and/or reception while array 60-2 is steered to sector 232 (e.g., while processing step 124 of FIG. 8). Device 10-1 may identify that device 10-2 is not within sector 232 (e.g., by gathering performance metric data that lies outside of the predetermined range while processing step 126 of FIG. 8). Device 10-1 may subsequently steer array 60-2 to sector 234 (e.g., while processing step 134 and looping back to step 122 of FIG. 8). Device 10-1 may subsequently identify that device 10-2 is located within sector 234 (e.g., by gathering performance metric data that lies within the predetermined range while processing step 126 of FIG. 8). Similar operations may be performed by device 10-2 to identify sector 234 of array 60-6 within which device 10-1 is located. Bidirectional communications between devices 10-1 and 10-2 may then resume until one of the devices moves out of sector 234.

In this way, device 10-1 may sweep through sectors beginning at the last known successful sector (i.e., sector 230) and moving to other sectors and arrays progressively farther away from sector 230 of array 60-1 (e.g., as shown by arrow 238) until device 10-2 is found. In another suitable arrangement, device 10-2 may use a camera or other sensor to determine that device 10-2 is at location 236, may use orientation and location information about device 10-1 to determine that sector 234 of array 60-2 overlaps with location 236, and may subsequently steer array 60-2 to sector 234 for performing bidirectional millimeter wave communications with device 10-2. Performing sector sweeping in this way may consume significantly less time than sweeping over all possible sectors and then processing performance metric data for each sector to identify the location of device 10-2. This example is merely illustrative. If desired, each possible sector adjacent to last successful sector 230 may be swept through before steering the beam to farther sectors such as sectors 232 and 234. The sector sweep may be performed in any desired direction. Such processes may continue over any number of arrays 60 until device 10-2 is found.

Control circuitry 14 may be configured to perform these operations (e.g., the operations of FIGS. 7 and 8) using hardware (e.g., dedicated hardware or circuitry) and/or software (e.g., code that runs on the hardware of device 10). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 14. The processing circuitry may include application-specific integrated circuits with processing circuitry, one or more microprocessors, or other processing circuitry.

The foregoing is merely illustrative and various modifications can be made to the described embodiments. The foregoing embodiments may be implemented individually or in any combination.

What is claimed is:

1. An electronic device configured to communicate with an external device, the electronic device comprising:
    a first phased antenna array configured to transmit and receive millimeter wave signals;
    a second phased antenna array configured to transmit and receive additional millimeter wave signals;
    beam steering circuitry coupled to the first phased antenna array;
    additional beam steering circuitry coupled to the second phased antenna array;
    an electronic device orientation sensor configured to generate orientation data; and
    control circuitry coupled to the beam steering circuitry and the additional beam steering circuitry, wherein the control circuitry is configured to:
        control the beam steering circuitry to steer the millimeter wave signals in a first direction and establish a communications link with the external device,
        determine whether the millimeter wave signals in the first direction satisfy predetermined wireless performance criteria, and
        in response to determining that the millimeter wave signals in the first direction fail to satisfy the predetermined wireless performance criteria, control the additional beam steering circuitry to perform sector scanning operations by steering the additional millimeter wave signals in a set of directions that progressively move away from the first direction based on the orientation data.

2. The electronic device defined in claim 1, wherein the control circuitry is further configured to:
    determine whether the additional millimeter wave signals in a second direction in the set of directions satisfy the predetermined wireless performance criteria; and
    control the additional beam steering circuitry to steer the additional millimeter wave signals in a third direction in the set of directions that is adjacent to the second direction in response to determining that the additional millimeter wave signals in the second direction fail to satisfy the predetermined wireless performance criteria.

3. The electronic device defined in claim 2, wherein the control circuitry is further configured to:
    determine whether the additional millimeter wave signals in the third direction satisfy the predetermined wireless performance criteria; and
    control the additional beam steering circuitry to steer the additional millimeter wave signals in a fourth direction in the set of directions that is adjacent to the third direction in response to determining that the additional millimeter wave signals in the third direction fail to satisfy the predetermined wireless performance criteria.

4. The electronic device defined in claim 2, wherein the control circuitry is further configured to:
    control the additional millimeter wave signals to remain in the second direction in response to determining that the additional millimeter wave signals in the second direction satisfy the predetermined wireless performance criteria.

5. The electronic device defined in claim 1, wherein the control circuitry is configured to determine whether the millimeter wave signals in the first direction satisfy the predetermined wireless performance criteria by gathering wireless performance metric data and comparing the wireless performance metric data to a predetermined range of wireless performance metric values.

6. The electronic device defined in claim 5, further comprising:
    a non-millimeter wave antenna, wherein the control circuitry is configured to receive the wireless performance metric data from the external device using the non-millimeter wave antenna.

7. The electronic device defined in claim 1, further comprising:
    an electronic device housing, wherein the first phased antenna array is formed at a first side of the electronic device housing and the second phased antenna array is formed at a second side of the electronic device housing.

8. The electronic device defined in claim 1, wherein the control circuitry is configured to select the second direction based on a change in orientation of the electronic device identified by the orientation data.

9. The electronic device defined in claim 1, wherein the electronic device orientation sensor comprises an inertial measurement unit configured to generate the orientation data.

10. A method of operating an electronic device to communicate with an external device, wherein the electronic device includes control circuitry and at least one phased antenna array that is configured to transmit and receive a steerable beam of millimeter wave signals, the method comprising:
- with the control circuitry, gathering first wireless performance data associated with the millimeter wave signals while the millimeter wave signals are steered in a first direction and determining whether the first wireless performance data satisfies a predetermined wireless performance criterion;
- in response to determining that the first wireless performance data fails to satisfy the predetermined wireless performance criterion, with the control circuitry, steering the millimeter wave signals in a second direction that is adjacent to the first direction, gathering second wireless performance data associated with the millimeter wave signals while the millimeter wave signals are steered in the second direction, and determining whether the second wireless performance data satisfies the predetermined wireless performance criterion, wherein the first direction is the last direction for which successful communications with the external device were performed;
- in response to determining that the second wireless performance data fails to satisfy the predetermined wireless performance criterion, with the control circuitry, steering the millimeter wave signals in a third direction that is different from the first and second directions; and
- in response to determining that the second wireless performance data satisfies the predetermined wireless performance criterion, with the control circuitry, controlling the millimeter wave signals to remain steered in the second direction.

11. The method defined in claim 10, wherein the second direction is adjacent to the first direction.

12. The method defined in claim 10, further comprising:
- with an inertial measurement unit, generating device orientation data, wherein steering the millimeter wave signals in the second direction comprises steering the millimeter wave signals based on the generated device orientation data.

13. The method defined in claim 10, wherein determining whether the first wireless performance data satisfies the predetermined wireless performance criterion comprises comparing the first wireless performance data to a predetermined threshold value.

14. The method defined in claim 13, wherein the first wireless performance data comprises an error rate value and comparing the first wireless performance data to the predetermined threshold value comprises comparing the error rate value to a maximum error rate threshold value.

15. The method defined in claim 10, further comprising:
- with the control circuitry, gathering third wireless performance data associated with the millimeter wave signals while the millimeter wave signals are steered in the third direction;
- with the control circuitry, determining whether the third wireless performance data satisfies the predetermined wireless performance criterion;
- in response to determining that the third wireless performance data fails to satisfy the predetermined wireless performance criterion, with the control circuitry, steering the millimeter wave signals in a fourth direction that is different from the first, second, and third directions; and
- in response to determining that the third wireless performance data satisfies the predetermined wireless performance criterion, with the control circuitry, controlling the millimeter wave signals to remain steered in the third direction.

16. The method defined in claim 10, wherein the at least one phased antenna array comprises first and second phased antenna arrays on different sides of the electronic device, gathering the first wireless performance data comprises gathering the first wireless performance data based on signals transmitted by the first phased antenna array, and steering the millimeter wave signals in the second direction comprises steering the second phased antenna array in the second direction based on sensor data gathered by the control circuitry.

17. The method defined in claim 10, further comprising:
- before gathering the first wireless performance data associated with the millimeter wave signals while the millimeter wave signals are steered in the first direction and determining whether the first wireless performance data satisfies the predetermined wireless performance criterion, performing bi-directional communications with the external device while the millimeter wave signals are steered in the first direction.

18. The method defined in claim 17, further comprising, in response to determining that the second wireless performance data fails to satisfy the predetermined wireless performance criterion:
- repeatedly steering the millimeter wave signals in a different direction and determining whether wireless performance data associated with the millimeter wave signals at the different direction satisfies the predetermined wireless performance criterion until the wireless performance data associated with the millimeter wave signals at a most-recent different direction satisfy the predetermined wireless performance criterion.

19. An electronic device configured to communicate with an external device, the electronic device comprising:
- a phased antenna array configured to transmit and receive a beam of millimeter wave signals;
- beam steering circuitry coupled to the phased antenna array; and
- control circuitry coupled to the beam steering circuitry, wherein the control circuitry is configured to:
  - control the beam steering circuitry to place the beam of millimeter wave signals in a first orientation indicative of a first beam sector and to communicate with the external device using the beam of millimeter waves in the first orientation,
  - determine whether the beam of millimeter wave signals in the first orientation satisfies a wireless performance criterion,
  - perform sector scanning operations by using a set of beam sectors that are progressively distant from the first beam sector and that includes a second beam sector associated with a second orientation in response to determining that the beam of millimeter wave signals in the first orientation fails to satisfy the wireless performance criterion, and
  - determine whether the beam of millimeter wave signals in the second orientation satisfies the wireless performance criterion prior to gathering wireless performance data using a remaining portion of the set of beam sectors.

20. The electronic device defined in claim 19, wherein the control circuitry is further configured to:
- place the beam of millimeter wave signals in a third orientation that is different from the first and second orientations in response to determining that the beam of millimeter wave signals in the second orientation fails to satisfy the wireless performance criterion, wherein the third orientation is indicative of a third beam sector in the set of beam sectors.

21. The electronic device defined in claim 20, further comprising:

sensor circuitry configured to generate sensor data, wherein the control circuitry is configured to place the millimeter wave beam in the third orientation based on the sensor data generated by the sensor circuitry.

* * * * *